United States Patent [19]

Martinelli

[11] Patent Number: 4,638,176
[45] Date of Patent: Jan. 20, 1987

[54] UNINTERRUPTIBLE POWER SUPPLY

[75] Inventor: Robert M. Martinelli, Torrance, Calif.

[73] Assignee: Mullett Associates, Inc., Los Angeles, Calif.

[21] Appl. No.: 761,471

[22] Filed: Aug. 1, 1985

[51] Int. Cl.⁴ .............................................. H02J 9/00
[52] U.S. Cl. ....................................... 307/64; 307/66; 307/87; 307/85; 363/24; 363/97
[58] Field of Search ....................... 307/46, 48, 58, 64, 307/66, 82, 85, 86, 87; 363/24, 25, 26, 97

[56] References Cited

U.S. PATENT DOCUMENTS

| | | | |
|---|---|---|---|
| 3,337,743 | 8/1967 | Rolfes | 307/87 X |
| 3,614,461 | 10/1971 | Speer | 307/87 X |
| 3,684,891 | 8/1972 | Sieron | 307/66 |
| 3,745,365 | 7/1973 | Spreadbury et al. | 307/64 |
| 3,816,804 | 6/1974 | Cardwell | 307/66 X |
| 3,921,005 | 11/1975 | Watrous | 307/66 X |
| 3,991,319 | 11/1976 | Servos et al. | 307/64 |
| 4,010,381 | 3/1977 | Fickenscher et al. | 307/66 |
| 4,038,559 | 7/1977 | Chun et al. | 307/64 |
| 4,065,711 | 12/1977 | Kawabata | 307/66 X |
| 4,104,539 | 8/1978 | Hase | 307/66 X |
| 4,167,680 | 9/1979 | Gross | 307/66 |
| 4,388,534 | 6/1983 | Love et al. | 307/66 |
| 4,400,625 | 8/1983 | Hussey | 307/87 X |
| 4,473,756 | 9/1984 | Brigden et al. | 307/86 X |
| 4,516,035 | 5/1985 | Rhoads et al. | 307/87 X |
| 4,520,275 | 5/1985 | Marusik | 307/86 X |

OTHER PUBLICATIONS

"Designing an A.C. Power Inverter Using High Frequency MOSFET Sinewave Synthesis" by Power Concept, Inc., 1984.

Primary Examiner—William M. Shoop, Jr.
Assistant Examiner—Shik Luen Paul Ip
Attorney, Agent, or Firm—John T. Matlago

[57] ABSTRACT

An uninterruptible power supply provides for input sinewaves of an AC utility to be separated by diode rectifiers to apply positive half sinewaves on a plus d.c. line and negative half sinewaves on a minus d.c. line. A battery-powered high-frequency inverter forming a part of the power supply includes a full wave diode rectifier for applying bursts of positive going pulses having sinusoidally varying duty cycles on a plus d.c. bus and bursts of negative going pulses having sinusoidally varying duty cycles on a minus d.c. bus. The plus d.c. line and the plus d.c. bus are joined and connected by a first synchronous switch to a common junction and the minus d.c. line and the minus d.c. bus are joined and connected by a second oppositely phased synchronous switch to the same common junction. The inverter is driven by bursts of pulses having sinusoidally varying duty cycles generated by comparing the amplitudes of feedback output half sinewave signals and reference half sinewave signals. During brownout, the bursts of pulses applied on the plus and minus d.c. busses are respectively diode ORed with the positive and negative half sinewaves on the plus and minus d.c. lines to form positive and negative composite waveforms on the common junction which are passed through a low pass filter to provide regulated output sinewaves to the load.

9 Claims, 10 Drawing Figures

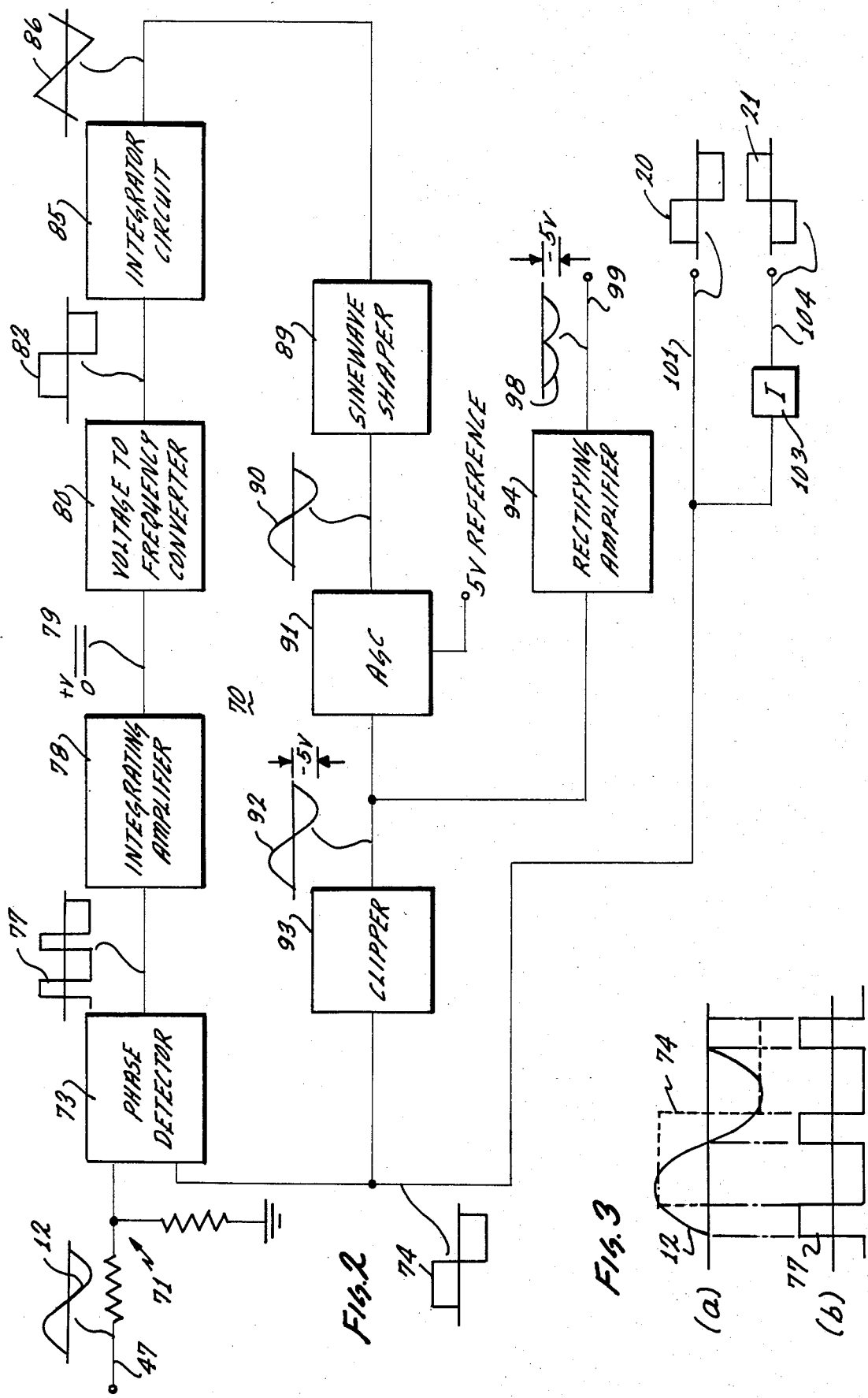

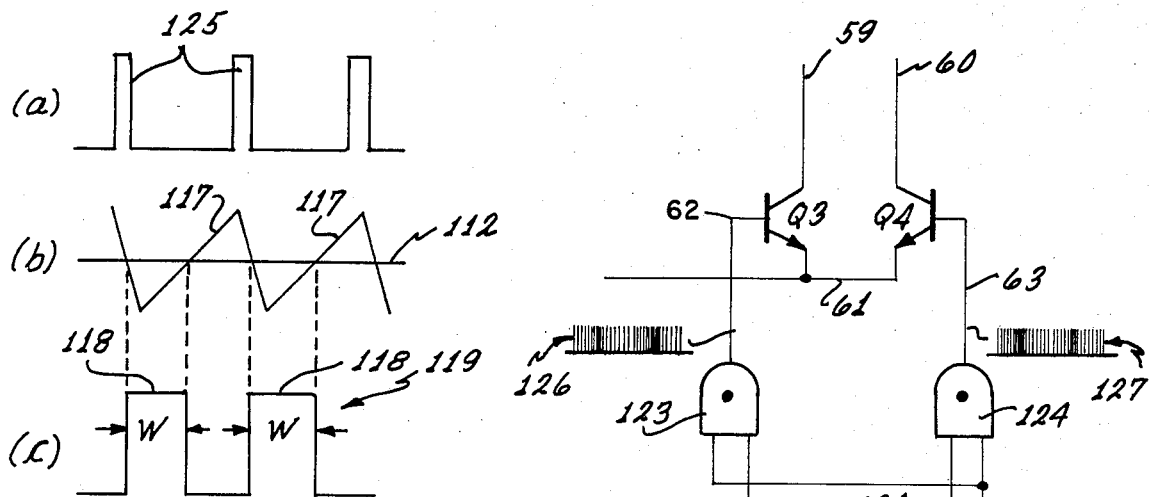
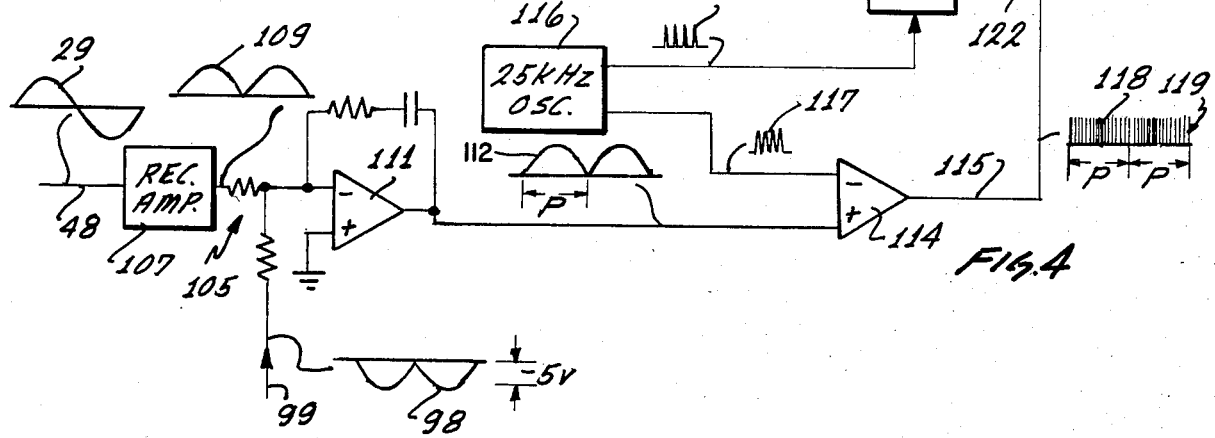
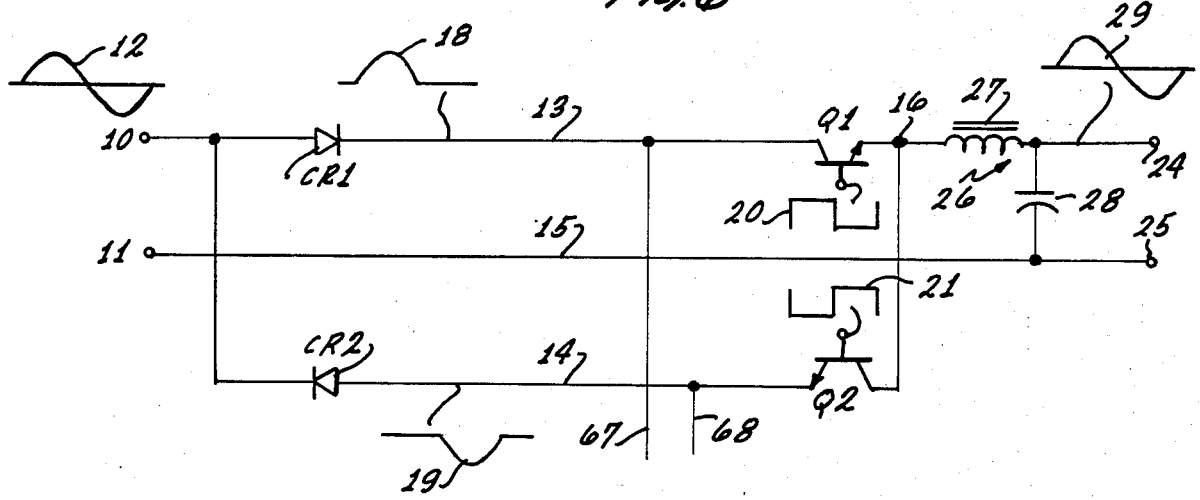

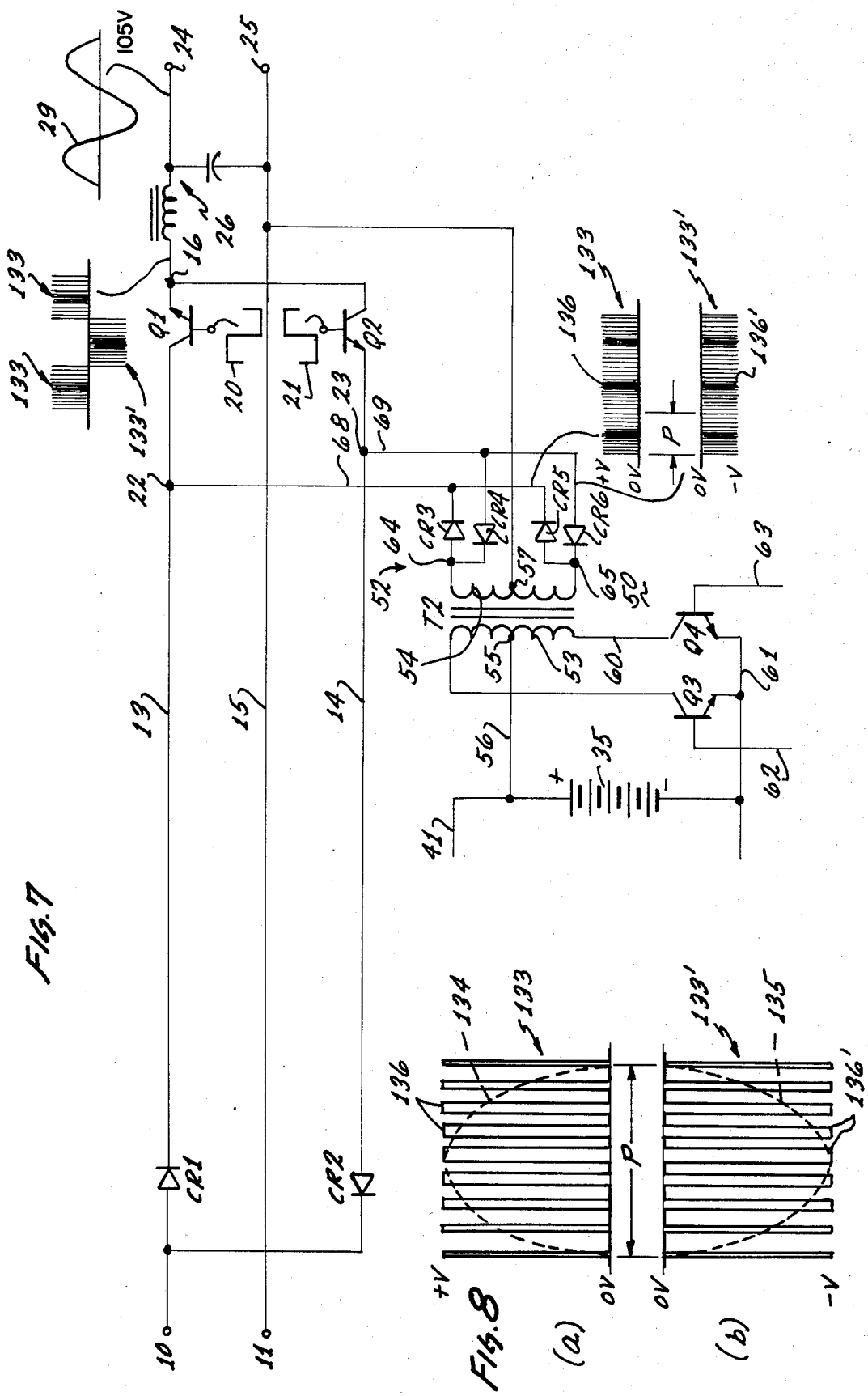

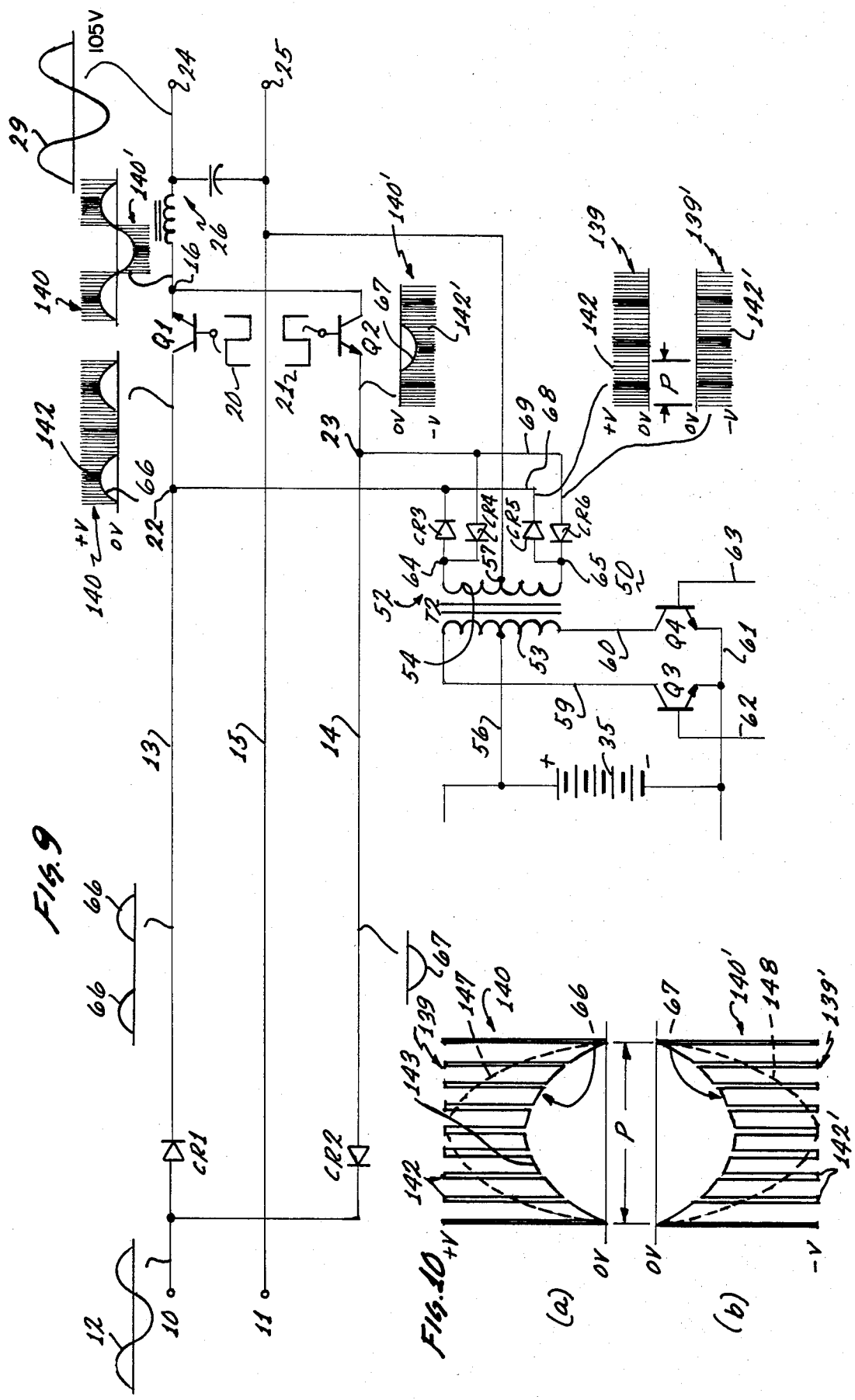

UNINTERRUPTIBLE POWER SUPPLY

BACKGROUND OF THE INVENTION

This invention relates to an uninterruptible AC power supply and more particularly to such a power supply wherein a battery-powered high-frequency inverter is used to supplement a failing power provided by an AC utility to maintain a regulated AC power output to the load.

It is known in the prior art to have an uninterruptible AC power supply which provides for a transfer from an AC utility power to a battery-powered high-frequency inverter when the utility power fails. Thus in such prior art power supplies, whether the AC utility power fails completely or partially a complete or substantial transfer is made from the utility power to the inverter. Such an uninterruptible power supply is not only inefficient but places a large demand on the battery so as to shorten the time that it is able to perform. It is highly desirable, therefore, to be able to provide an AC uninterruptible power supply wherein when the utility power partially fails only enough power is drawn from the battery-powered high-frequency inverter to make up for the drop in the utility power.

SUMMARY OF THE INVENTION

An uninterruptible power supply is provided wherein an input terminal receiving AC utility power is connected to a plus d.c. input line and a minus d.c. input line having oppositely phased rectifying diodes therein. Such a circuit arrangement provides for separating the positive and negative halves of the utility sinewaves by applying the positive half sinewaves on the plus d.c. input line and the negative half sinewaves on the minus d.c. input line. The plus and minus d.c. input lines are respectively connected to the inputs of first and second oppositely phased synchronous switches which are alternately turned on each half cycle to connect the positive and negative half sinewaves to a common junction which is connected by a low pass filter to the output terminal of the power supply.

The power supply includes a battery-powered high-frequency inverter provided with a pair of drive transistors which are alternately driven by bursts of pulses having sinusoidally varying duty cycles as generated by a pulse width modulator in response to positive error half sinewave signals having an amplitude that corresponds to the difference in amplitude between feedback half sinewave signals derived from the sinewaves on the output terminal and reference half sinewave signals of a fixed amplitude that are synchronized with the sinewaves on the input terminal. The pair of alternately driven transistors apply battery voltage in alternate directions through the primary winding of an inverter transformer to induce an alternating voltage across the secondary winding thereof. A full wave diode rectifier connected across the secondary winding of the inverter transformer is arranged to provide bursts of positive going pulses having sinusoidally varying duty cycles onto a plus d.c. input bus and bursts of negative going pulses having sinusoidally varying duty cycles onto a minus d.c. input bus. The plus and minus d.c. input busses are respectively connected to the inputs of the same first and second oppositely phased synchronously switches that the plus and minus d.c. lines are respectively connected to.

With such an arrangement, when full AC utility power is present on the input terminal of the uninterruptible power supply, which is referred to as the normal mode of operation, and is indicated by the amplitude of the feedback half sinewave signals being greater than or equal to the amplitude of the reference half sinewave signals, the error half sinewave signals are negative or zero in potential and the inverter is turned off such that the only input power being supplied to the first and second synchronous switches is that provided by the positive and negative half sinewaves on the plus and minus d.c. input lines. Thus, the positive and negative half sinewaves are effectively reconstructed into full sinewaves by the first and second oppositely phased synchronous switches and passed through the low pass output filter to the output terminal. Accordingly, in the normal mode of operation of the uninterruptible power supply all the power supplied to the load is provided by the AC utility.

On the other hand, when the input AC utility power supplied on the input terminal fails completely, which is a condition referred to as the blackout mode, and is indicated by the amplitude of the feedback half sinewave signals being less than the amplitude of the reference half sinewave signals, the error half sinewave signals are at their maximum positive amplitude and the inverter is turned on. The modulator responds to these positive error half sinewave signals to generate bursts of drive pulses having sinusoidally varying duty cycles. These bursts of drive pulses are applied to the pair of drive transistors to drive the inverter to provide bursts of positive and negative going pulses having corresponding sinusoidally varying duty cycles on the plus and minus d.c. input busses thereof which are respectively passed through the first and second oppositely phased synchronous switches to the common junction. These alternating bursts of positive and negative going pulses then pass through the low pass output filter, which filters out the high frequency thereof, to form regulated full sinewaves on the output terminal. Thus, in the blackout mode all the AC power supplied to the load is provided by the inverter.

When the AC utility power supplied on the input terminal only partially fails, which is a condition referred to as brownout mode, and is indicated by the amplitudes of the feedback half sinewave signals being proportionately less than the fixed amplitude of the reference half sinewave signals, the error half sinewave signals are proportionately more positive in potential. The modulator responds to these positive error half sinewaves to generate bursts of drive pulses having sinusoidally varying duty cycles which serve to drive the inverter and, therefore, the full wave diode rectifier to provide bursts of positive and negative going pulses having corresponding sinusoidally varying duty cycles on the plus and minus d.c. input busses. These bursts of positive and negative going pulses being provided on the plus and minus d.c. input busses are respectively connected to the inputs of the first and second oppositely phased synchronous switches in synchronism with the reduced amplitude positive and negative half sinewaves being provided on the plus and minus d.c. input lines.

As a result of such a connecting arrangement, the reduced amplitude positive half sinewaves on the plus d.c. input line and the bursts of positive going pulses having sinusoidally varying duty cycles on the plus d.c. input bus are diode ORed to provide positive going composite waveforms on the input to the first synchronous switch. Likewise, the reduced amplitude negative half sinewaves on the minus d.c. input line and the bursts of negative going pulses having sinusoidally varying duty cycles on the minus d.c. input bus are diode ORed to provide negative going composite waveforms on the input to the second synchronous switch. The first and second oppositely phased switches are alternately turned on to gate the positive and negative going composite waveforms onto the common junction. Upon these alternate positive and negative going composite waveforms passing through the low pass filter, their higher order harmonics are readily filtered out resulting in full regulated sinewaves being provided on the output terminal.

Accordingly, one of the objects of the present invention is to provide for splitting the sinewaves of an AC utility power input to provide positive and negative half sinewaves to facilitate the adding thereto of bursts of positive and negative going pulses having sinusoidally varying duty cycles as provided by a battery-powered high-frequency inverter.

Another object of the present invention is to provide for respectively diode ORing the positive and negative half sinewaves of an AC utility with bursts of positive and negative going pulses having sinusoidally varying duty cycles as provided by a battery-powered high-frequency inverter so that when the AC utility power partially fails the inverter can be turned on to provide just enough power to supplement the utility power so as to maintain full AC power on the load.

These and other objects, features and advantages of the present invention will become more fully apparent upon the consideration of the specific illustrative embodiment shown in the accompanying drawings.

BRIEF DESCRIPTION OF THE DRAWINGS

FIG. 2 is a block diagram of a phase-locked loop circuit for generating reference half sinewave signals;

FIG. 3 shows an input sinewave and a reference squarewave compared in the phase detector to provide a pulse output indicative of their phase difference;

FIG. 4 is a block diagram of the circuits of the pulse width modulator;

FIG. 5 shows the waveforms that are compared in the comparator of the modulator and the width modulated output pulses generated thereby;

FIG. 6 shows the circuits active in supplying power to the load during the normal mode of operation of the uninterruptible power supply;

FIG. 7 shows the circuits active in supplying power to the load during the blackout mode of operation of the uninterruptible power supply;

FIG. 8 is a diagrammatic illustration of bursts of positive and negative going pulses having sinusoidally varying duty cycles as generated by the inverter on the plus and minus d.c. input busses during the blackout mode of operation of the uninterruptible power supply;

FIG. 9 shows the circuits active in supplying power to the load during the brownout mode of operation of the uninterruptible power supply; and FIG. 10 is a diagrammatic illustration of the composite waveforms produced by diode ORing the positive and negative halves of the input sinewaves with the respective bursts of positive and negative going pulses having sinusoidally varying duty cycles as generated by the inverter during the brownout mode of operation of the uninterruptible power supply.

DETAILED DESCRIPTION OF THE PREFERRED EMBODIMENT

Figure 1:
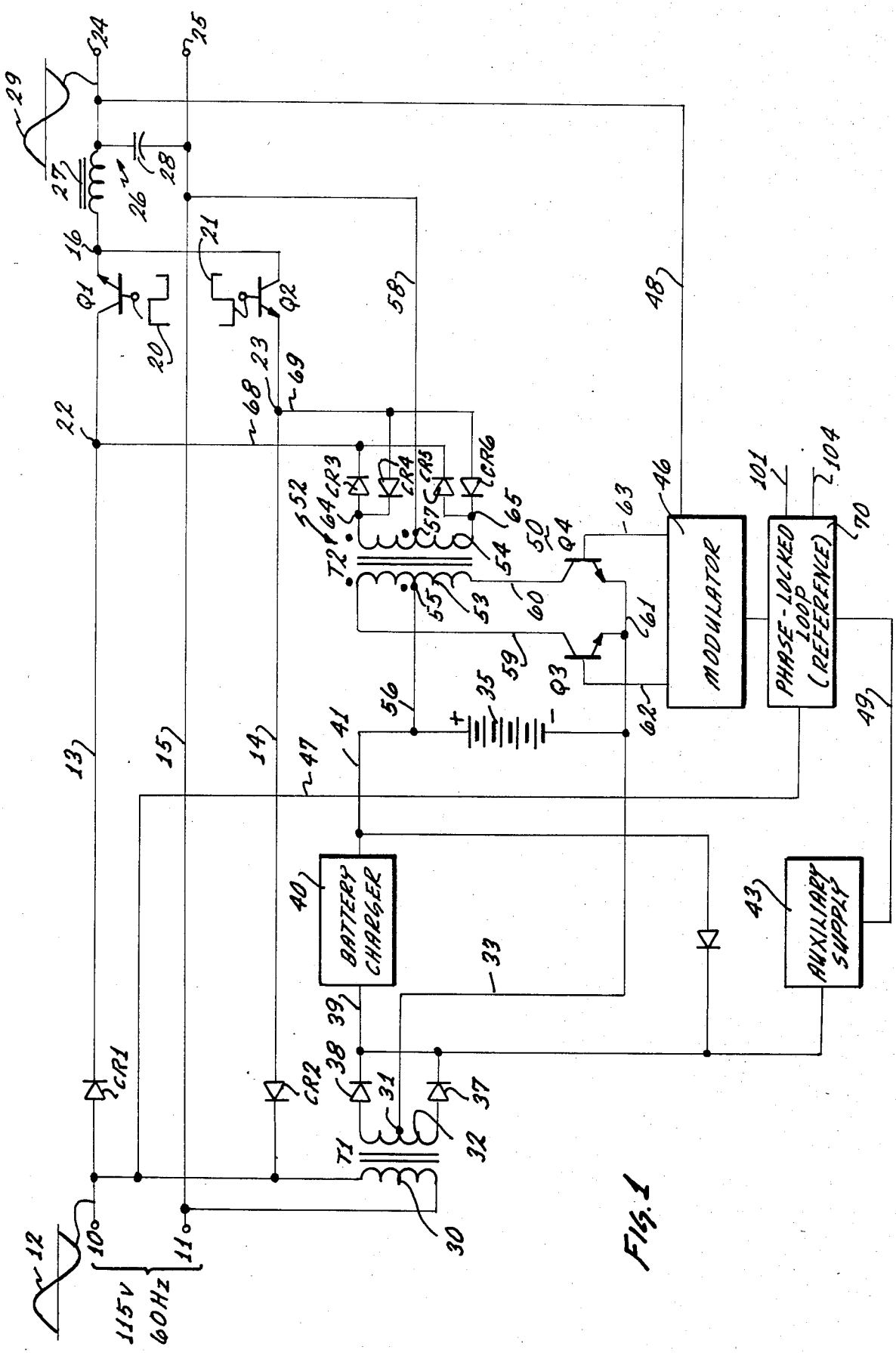
FIG. 1 is a schematic diagram of an uninterruptible power supply in accordance with the present invention.

Referring to FIG. 1, a 115 V, 60 Hz input sinewave 12, as provided by an AC utility, is shown applied across input terminals 10 and 11 of the uninterruptible power supply system of the present invention. Input terminal 10 is jointly connected to a plus d.c. input line 13 and minus d.c. input line 14 connected in parallel. Input terminal 11 is connected to a neutral line 15. The plus d.c. input line 13 has therein a rectifying diode CR1 oriented with its cathode connected to the collector of a n-p-n transistor Q1. The minus d.c. input line 14 has therein a rectifying diode CR2 oriented with its anode connected to the emitter of a n-p-n transistor Q2. The emitter of transistor Q1 and the collector of transistor Q2 are connected to a common junction 16.

The transistors Q1 and Q2, which function as first and second oppositely phased synchronous switches, are alternately driven each half cycle by oppositely phased squarewave pulses 20 and 21 applied on their respective bases. As will be described hereinafter, these squarewave pulses 20 and 21 are derived from reference sinewave signals that are generated and synchronized with the input sinewaves 12 when the latter are present (FIG. 2).

Thus, when transistor Q1 is turned on it passes each input positive half sinewave conducted by diode CR1 on plus d.c. input line 13 and when transistor Q2 is turned on it passes each input negative half sinewave conducted by diode CR2 on minus d.c. input line 14 to thereby reconstruct the incoming sinewaves provided by the AC utility at the common junction 16.

The common junction 16 is connected to an output terminal 24 of the power supply by way of a low pass filter 26 which includes an inductor 27 in series with and a capacitor 28 in shunt with the line connected to output terminal 24. As will be noted hereinafter, the filter 26 filters out any high frequencies of the waveforms applied thereto so as to provide output sinewaves 29 to a load connected across output terminals 24 and 25, the latter output terminal being connected to the neutral line 15.

The uninterruptible power supply of the present invention provides for taking a small amount of the AC utility power input to charge a battery 35 which provides power for an auxiliary power supply. Thus, for this purpose, the AC utility on input terminals 10 and 11 is connected across a primary winding 30 of a transformer T1. The ends of the secondary winding 32 of the transformer T1 are connected to a full wave rectifying circuit comprising diodes 37 and 38 which provide a pulsating d.c. on the input 39 connected to a battery charger 40. The output 41 of the battery charger 40 is connected to the positive side of the battery 35 and the midpoint 31 of the secondary winding 32 of the transformer T1 is connected by lead 33 to the negative side of the battery 35. A low voltage auxiliary supply 43 is also connected to be charged by the pulsating d.c. pulses passed by diodes 37 and 38 and by the pulsating d.c. output of the battery charger 40.

It should now be clear that, except for the small amount of the AC utility power that is used to charge the battery 35, all the AC utility sinewave input is rectified by diodes CR1 and CR2 to apply positive and negative half sinewaves on the plus and minus d.c. input lines 13 and 14, respectively. The positive and negative half sinewaves are then reconstructed by use of the first and second oppositely phased synchronous switches, i.e., transistors Q1 and Q2, so as to supply a full sinewave on the output terminal 24.

The power supply includes a modulator 46, a phase-locked loop circuit 70, and a high-frequency inverter 50. The modulator 46 is provided with an input lead 48 connected to output terminal 24. The phase-locked loop circuit 70 is provided with an input lead 47 connected to the input terminal 10, and also with an input lead 49 carrying power from the low voltage auxiliary supply 43. The inverter 50 comprises a transformer T2 having a primary winding 53 and a secondary winding 54. The center tap 55 of primary winding 53 is connected by lead 56 to the positive side of battery 35 and the center tap 57 of the secondary winding 54 is connected by lead 58 to the neutral line 15. The opposite ends of the primary winding 53 are respectively connected by leads 59 and 60 to the collectors of n-p-n transistors Q3 and Q4, the emitters of which are connected by a common lead 61 to the negative side of the battery 35. Drive lines 62 and 63 on the output of the modulator 46 are connected to the base electrodes of the transistors Q3 and Q4, respectively. As will be described hereinafter, the drive lines 62 and 63 carry bursts of pulses whose widths have been modulated to have sinusoidally varying duty cycles.

It should now be clearly understood that when the inverter 50 is running, the transistors Q3 and Q4 are alternately turned on by the pulses of the bursts of pulses applied to their base electrodes, thereby causing the d.c. current supplied by the battery 35 to conduct in opposite directions through the primary winding 53 of the inverter transformer T2. This induces an a.c. voltage across the opposite ends of the secondary winding 54 in accordance with the widths of the successive drive pulses of the bursts of pulses applied to the base electrodes of transistors Q3 and Q4.

The secondary winding 54 of the transformer T2 has connected thereacross a full wave diode rectifier 52 comprised of four diodes CR3-CR6. Thus the upper end 64 of the secondary winding 54 has connected thereto a diode CR3 oriented to pass a positive going pulse and a diode CR4 oriented to pass a negative going pulse. Likewise, the lower end 65 of the secondary winding 54 has connected thereto a diode CR5 oriented to pass a positive going pulse and a diode CR6 oriented to pass a negative going pulse.

The similarly oriented diodes CR3 and CR5 located on the opposite ends of the secondary winding 54 are connected to a plus d.c. input bus 68 connected at point 22 to the collector of transistor Q1, and the similarly oriented diodes CR4 and CR6 located on the opposite ends of the secondary winding 54 are connected to a minus d.c. input bus 69 connected at point 23 to the emitter of transistor Q2.

As will be described hereinafter, the transistors Q3 and Q4 are alternately turned on by the pulses of the bursts of pulses having sinusoidally varying duty cycles as applied on their base electrodes by drive lines 62 and 63 on the output of modulator 46.

Thus, when transistor Q3 is turned on current injected from the positive side of the battery 35 into the center tap 55 of primary winding 53 conducts through the upper half of the primary winding 53 of transformer T2 through lead 59 and transistor Q3 to the negative side of the battery 35. Under this condition, a positive pulse is induced on the lower end 65 of the secondary winding 54 and a negative voltage pulse is induced on the upper end 64 of the secondary winding 54. The positive pulse at the lower end 65 forward biases diode CR5 connecting a positive pulse on the plus d.c. input bus 68 to the collector of transistor Q1, while the negative pulse at the upper end 64 of the secondary winding 54 forward biases CR4 connecting a negative pulse on the minus d.c. input bus 69 to the emitter of Q2. If transistor Q1 is turned on, at this time, a positive going pulse is applied to the inductor 27 connected to the common point 16. On the other hand, if transistor Q2 is turned on, at this time, a negative going pulse is applied to the inductor 27 connected to the common junction 16.

Likewise, when transistor Q4 is turned on, current injected from the positive side of the battery 35 into the center tap 55 of the primary winding 53 conducts through the lower half of the primary winding 53 of transformer T2 through lead 60 and transistor Q4 to the negative side of battery 35. Under this condition, a negative voltage pulse is induced on the lower end 65 of the secondary winding 54 and a positive voltage is induced on the upper end 64 of the secondary winding 54. The positive pulse at the upper end 64 biases CR3, connecting a positive pulse on the plus d.c. input bus 68 to the collector of Q1, while the negative pulse at the lower end 65 forward biases CR6 connecting a negative pulse on the minus d.c. input bus 69 to the emitter of transistor Q2. If transistor Q1 is on at this time, a positive going pulse is applied to the inductor 27 connected to the common point 16. On the other hand, if transistor Q2 is on at this time, a negative going pulse is applied to the inductor 27 connected to common junction 16.

It should now be clearly understood that the inverter 50 is driven by transistors Q3 and Q4 to switch the d.c. supply provided by the battery 35 back and forth to produce successive bursts of positive going pulses having sinusoidally varying duty cycles on the plus d.c. input bus 68 and to produce successive bursts of negative going pulses having sinusoidally varying duty cycles on the minus d.c. input bus 69. It should be especially noted that the positive going pulses on the plus d.c. input bus 68 are a mirror image of the negative going pulses on the minus d.c. input bus 69.

The inverter 50 is off during the normal mode of operation of the uninterruptible power supply of the present invention. Thus, during the normal mode of operation, the 115 VAC sinewaves received from the utility are separated to provide positive half sinewaves on the plus d.c. input line 13 and negative half sinewaves on the minus d.c. input line 14. These half sinewaves are then reconstructed by the transistors Q1 and Q2 and passed through output filter 26 to provide the output sinewaves 29 on the output terminal 24.

However, upon a failure of any amount of the normal AC utility power, the modulator 46 senses the amount of the loss in the power at the power output terminal 24 by comparing feedback half sinewave signals derived from the sinewaves on the output terminal 24 with the fixed amplitude reference half sinewave signals that are synchronized with the sinewaves at the input terminal. Any error half sinewave signals that are generated cause the inverter 50 to start running to make up for the loss by providing power in the form of bursts of positive and negative going pulses having sinusoidally varying duty cycles on the plus and minus d.c. input busses 68 and 69, respectively. These bursts of pulses on the plus and minus d.c. input busses 68 and 69 are diode ORed with the reduced amplitude half sinewaves on the plus and minus d.c. input lines 13 and 14, respectively, to supplement this drop in the incoming AC power to thereby maintain the AC output power at its regulated full power of 105 volts.

The present power supply system thus provides for automatically introducing AC power from the battery-powered high-frequency inverter 50 to supplement the AC utility power when the latter fails so as to keep the output of the uninterruptible power supply to the load at full regulated power at all times. Hence if the input utility power completely fails, as in a blackout, all the power supplied at the output terminal 24 is provided by the inverter 50. However, if the input AC utility power only partially fails, as in a brownout, the inverter 50 provides just enough power on its plus and minus d.c. input busses 68 and 69, which power is diode ORed with the reduced amplitude a.c. utility power on the plus and minus d.c. input lines 13 and 14, to maintain a full regulated power at the output terminal 24.

Reference will next be made to FIG. 2 which shows a block diagram of a phase-locked loop circuit 70 as provided in modulator 46 for synchronizing a reference sinewave 92 with the incoming utility sinewave 12. During the operation of the power supply, when the 60 Hz sinewave 12 is present on the input terminal 10, it is supplied on line 47 where it passes through a voltage divider 71 and is fed into one of the inputs of a phase detector 73. A squarewave 74 derived from the reference sinewave being generated in the phase-locked loop 70 is fed to the other input of the phase detector 73. It should be appreciated that when adjusting the phase of the reference sinewave to the incoming utility sinewave, it is advantageous for the reference sinewave to be fed back into the phase detector in the form of a squarewave since this enables rapid sensing of the zero crossings so that the phase error can be correctly ascertained.

The phase detector 73 compares the utility sinewave 12 and the reference squarewave 74, as illustrated in FIG. 3a, to provide an output waveform, as illustrated in FIG. 3b, wherein the widths of the pulses 77 correspond to the phase difference of these waves. The pulses 77 are integrated in an integrating amplifier 78 to provide an output d.c. voltage 79 having a level which is a function of the phase error. The output d.c. voltage 79 is fed to a voltage-to-frequency converter 80 which effectively provides for changing the frequency of the squarewave 74 to provide an output squarewave 82 on the output of converter 80 which is synchronized with the input sinewave 12. Thus, if the pulse output of the phase detector 73 is positive, indicating the zero crossing of the squarewave 74 is behind the zero crossing of the sinewave 12, the voltage-to-frequency converter 80 decreases the frequency of the squarewave 82 generated thereby, i.e., the period of the squarewave 74 is effectively made a little larger, so that it gets back into being synchronized with the sinewave 12. The squarewave 82, which is the squarewave 74 after being synchronized, is then fed into an integrator circuit 85 which integrates it to provide a sawtooth S6 which, upon being fed into a shaper 89, is formed back into a sinewave 90. This sinewave 90 is next fed into an automatic gain control (AGC) circuit 91 which is connected to a 5 volt reference to provide a reference sinewave 92 having a 5 volt amplitude.

It should be noted that the reference sinewave 92 is fed into a zero crossing detecting clipper 93 which reforms it into the squarewave 74 that is fed back into the phase detector 73 for comparsion with the utility input sinewave 12.

In as much as the circuits of the present uninterruptible power supply are operating with half cycle signals, the reference sinewave 92 is fed through a rectifying amplifier 94 to provide on line 99 a series of negative half sinewaves 98 which serve as the reference half sinewave signals.

Moreover, the squarewave 74 derived from the reference sinewave 92 is applied onto control line 101 and, upon being inverted in inverting circuit 103, is applied on control line 104. The control lines 101 and 104 provide the oppositely phased squarewave control pulses 20 and 21 (FIG. 1) which are applied to the base electrodes of transistors Q1 and Q2, respectively, causing them to alternately conduct on successive half cycles of the input sinewave to thereby reconstruct the sinewave on the common junction 16.

It should now be clearly understood that when the power supply is operating with the utility input sinewave 12 present on terminal 10, the phase-locked circuit 70 is always operating to setup the regulated reference sinewave 92 so that it will be available for use when the utility power starts to fail.

Although the input utility sinewave is designed to be normally at 115 VAC, 60 Hz, the phase-locked circuit 70 operates to generate the reference sinewave 92 which guaranties that the voltage on output terminal 24 does not get lower than 105 VAC which is the minimum accepted by the equipment to be powered thereby.

It should be noted that when the input utility power supply completely fails such that the power supply operates in the blackout mode, with all the power on the output terminal 24 being supplied by the battery-powered inverter 50, it is still necessary to have a reference sinewave 92. However, during this time the reference sinewave does not have to be exactly 60 Hz. The power needed to run the phase locked loop circuit 70 during this time is coming from the low voltage auxiliary supply 43 (FIG. 1). Thus, during this time, although, the reference sinewave 92 may be shifted slightly so as to be out of phase with the normally received 60 Hz incoming sinewave 12, it will, nevertheless, be locked in somewhere in the range of 55 to 65 Hz. However, once the input sinewave 12 is restored, the phase-locked loop circuit 70 again operates to synchronize the reference sinewave 92 back into synchronization with the input sinewave 12 at 60 Hz.

It is especially noted that it is important to have the reference sinewave 92 synchronized at all times with the sinewave 12 if some input power is still present on the line, such as in the brownout mode of operation.

Reference will next be made to FIG. 4 which shows the circuits of the modulator 46 in block diagram form. The sinewaves on the output terminal 24 (FIG. 1) are fed on lead 48 to a rectifying amplifier 107 which serves to multiply the amplitude of the sinewave 29 by a constant 0.03387 to provide a positive feedback half sinewave signal 109 on one input of a summing resistance network 105. The negative reference half sinewave signal 98 generated by the phase-locked loop circuit 70 (FIG. 2) is provided on the other input of summing resistance network 105.

The output of summing resistance network 105 is connected to the inverting input terminal of an error amplifier 111 that has its non-inverting input terminal grounded. Thus, the error amplifier 111 operates in a current summing mode to provide on the output thereof an error half sinewave signal 112 corresponding to the difference in the amplitudes of the feedback half sinewave signal 109 and the reference half sinewave signal 98.

Thus, when the amplitude of the feedback half sinewave signal 109 is greater than or at least equal to the amplitude of the reference half sinewave signal 98, the voltage of the error half sinewave 112 signal is negative or zero and, consequently the modulator 46 is turned off. Hence no bursts of pulses are provided on the output drive lines 62 and 63 of the modulator 46 for turning on transistors Q3 and Q4 of inverter 50. However, if, due to the failing of the AC utility power on input terminal 10, the amplitude of sinewave 29 on output terminal 24 starts to decrease, such that upon comparison in error amplifier 111, the reference half sinewave signal 98 is sensed as being larger in amplitude than the feedback half sinewave signal 109, a positive voltage error half sinewave signal 112 is produced. This positive error half sinewave 112 is fed into the non-inverting input of a comparator 114.

As seen in FIGS. 4 and 5a, a 25 K Hz oscillator 116 provides clock pulses 125 and, as seen in FIG. 5b, also provides each clock pulse period a half sawtooth waveform having a positive going ramp 117 which is fed into the inverting input of comparator 114. As seen in FIGS. 5b and 5c, during the period of each ramp 117, when the error half sinewave signal 112 is more positive in voltage than the ramp 117, the output 115 of comparator 114 swings high in potential and remains high until the error half sinewave signal 112 is less positive than the ramp 117 so as to produce one of the squarewave pulses 118 forming the bursts 119 of pulses on the output 115 of comparator 114. The magnitude of the voltage of the error half sinewave signal 112 during each clock pulse period thus determines the width of the pulse provided at that time on output 115. As noted, the burst 119 of pulses generated each error half sinewave signal 112 is indicated in the drawings as being periodically denser at the center of the half cycle p than at the ends to emphasize that the pulses at the center are wider and provide a greater average current.

It should now be understood that the widths of the squarewave pulses 118 forming each burst 119 of pulses are proportional to the amount of voltage that must be added to the positive and negative half sinewaves of incoming voltage sinewave 12 during each clock period of the 25 K Hz oscillator 116 to enable the output sinewave 29 to be equal to its regulated amplitude as determined by the reference sinewave 92. In other words, the modulator 46 is monitoring the output sinewave 29 and providing an output on the inverter 50 so that the output sinewave will follow the reference sinewave.

Thus, if the error half sinewave signal 112 happens to have, for example, a smaller amplitude than that indicated in FIG. 4, the widths of the pulses 118 in each burst 119 generated on the output 114 are narrower than those shown in FIG. 5c, and if the error half sinewave signal 112 happens to have a larger amplitude than that indicated in FIG. 4, the widths of the pulses 118 in each burst 119 generated on output 115 are wider than those shown in FIG. 5c.

Accordingly, a burst 119 of pulses 118 having a sinusoidally varying duty cycle is provided on the output line 115 for each error half sinewave signal 112. These same bursts of pulses 118 on line 115 are connected to the first input of each of the "and" gates 123 and 124.

As illustrated in FIG. 4, the clock pulses 125 provided by the 25 K Hz oscillator 116 are fed to the input of flipflop 120. Everytime a clock pulse 125 falls it triggers flipflop 120 to cause its outputs 121 and 122 to be successively high in potential. These outputs 121 and 122 of the flipflop 120 are fed into the second inputs of "and" gates 123 and 124, respectively. Thus, on successive clock pulse periods of the 25 K Hz oscillator 116, a pulse 118 of a burst of pulses 119 is passed through "and" gate 123 onto drive line 62 and then the next sequential pulse 118 of the burst of pulses 119 is passed through "and" gate 124 onto drive line 63.

The bursts of pulses 126 and 128, provided on the outputs of "and" gates 123 and 124, are applied on the base electrodes of transistors Q3 and Q4, respectively, causing them to alternately conduct to operate the inverter 50 to produce output pulses on the plus and minus d.c. input busses 68 and 69 connected to outputs of the full wave diode rectifier 52 connected across the secondary winding 54 of the transformer T2 in inverter 50 (FIG. 1).

Reference will next be made to FIG. 6 which illustrates the operation of the uninterruptible power supply when operating in its normal mode, i.e., with the full 115 VAC input sinewave 12 on its input terminal 10 supplying power to the load across output terminals 24 and 25.

The 115 VAC input sinewave 12 on input terminal 10 is present on the anode of diode CR1 in plus d.c. input line 13 and the cathode of diode CR2 in minus d.c. input line 14. The squarewave 20 (FIG. 2) on the base electrode of transistor Q1 as derived from the reference sinewave 92 which is synchronized with the input sinewave 12 (FIG. 2) enables transistor Q1 to be turned on to provide the positive half sinewave 18 of sinewave 12 on common junction 16 and the similarly synchronized oppositely phased squarewave 21 on the base electrode of transistor Q2 enables transistor Q2 to be turned on to provide the negative half sinewave 19 of sinewave 12 on common junction 16 to thereby reconstruct the input sinewave 12 which passes through low pass filter 26 to form output sinewave 29 on the output terminal 24.

The output sinewave 29 is continually being monitored by the modulator 46 and when the output sinewave 29 is reduced in the rectifing amplifier 107, during the normal mode of operation, the feedback half sinewave signal 109 produced is, for example, 5.2 VAC. Consequently, when compared with the 5 VAC reference half sinewave signal 98, the output error half sinewave signal 112 of the error amplifier 111 (FIG. 4) is negative with the result that no pulses are generated on the output 115 of the comparator 114. Consequently, the inverter 50 is not running.

Thus, in the normal mode of operation, the positive and negative halves 18 and 19 of the sinewave 12 are first separated by diode rectifiers CR1 and CR2 and then reconstructed by transistors Q1 and Q2 to form the output sinewave 29 which is readily passed through the output low pass filter 26 to the output terminal 24. This alternating current power continues in this fashion so long as the utility maintains an energizing input sinewave 12 of 115 VAC on the input terminal 10. It should be especially noted that this utility power is being directly coupled to the output terminal 24 without passing through the inverter 50.

Reference will next be made to FIG. 7 which illustrates the operation of the uninterruptible power supply when there is a blackout, i.e., a complete failure of the utility power on the input terminal 10.

It should be evident that inasmuch as there is no utility input sinewave 12 during the blackout mode of operation it is not possible during this time to synchronize the reference sinewave to the utility input sinewave. Thus during this mode of operation the phase-locked loop circuit 70 is operated by the low voltage from the auxiliary supply 43 to maintain the frequency of the reference sinewave 92 somewhere between 55 and 65 Hz by an internal standard. This causes no problem because the equipment to be powered by the output sinewave 29 will continue to operate at these frequencies. Of course, as soon as the utility power of 60 Hz is restored on the input terminal 10, the reference sinewave 92 will again be synchronized therewith.

Now it is, of course, realized that the desired regulated AC power of substantially 105 VAC does exist on the output terminal 24 for this mode of operation but this power is all being supplied by the reserve battery 35 through the inverter 50 since the utility power has failed completely.

Referring back to FIG. 4, in this blackout mode of operation, the output sinewave 29, which is, say at 104.975 VAC is reduced by rectifying amplifier 107 to provide a feedback half sinewave signal 109 equal to 4.9985 VAC. Inasmuch as the reference half sinewave signal 98 is minus 5.0 VAC, the finite difference in the amplitudes of these sinewave signals when summed in the summing resistance network 105 is 0.0015 VAC but, because of the high gain in the error amplifier 111, the error half sinewave signal 112 is approximately 1.3 VAC which is indicative of a peak duty cycle of 100% inverted duty cycle.

It should now be clear that the resulting bursts of drive pulses 126 and 127 generated by the modulator 46 are applied on the drive lines 62 and 63 to the base electrodes of transistors Q3 and Q4 to cause the inverter 50 to operate at full duty cycle during the blackout mode.

As previously described, as a result the burst 126 of drive pulses on line 62 and burst 127 of drive pulse on line 63, the current from battery 35 alternately conducts through the upper half and then the lower half of the primary winding 53. Now, because of the full wave diode rectifier 52 connected across the secondary winding 54, each time that either transistor Q3 or Q4 is turned on a positive going pulse is passed onto the plus d.c. input bus 68 and a negative going pulse is simultaneously passed onto the minus d.c. input bus 69. Thus, successive bursts 133 of positive going pulses 136 having sinusoidally varying duty cycles are provided on the plus d.c. input bus 68 and successive bursts 133' of negative going pulses 136' having sinusoidally varying duty cycle are provided on minus d.c. input bus 69.

In order to better understand the nature of the bursts of pulses generated each half cycle of the reference sinewave 92 during blackout, reference will be made to FIG. 8a which diagrammatically illustrates a simplified burst 133 of positive going pulses 136.

The positive dashed half sinewave 134 represents the fundamental frequency component of the burst 133 of pulses 136 which is obtained by inverting the d.c. supply voltage from the battery 35 by the use of the bursts of drive pulses 126 and 127 (FIG. 4) whose widths have been modulated to have sinusoidally varying duty cycles. First to be noted that the amplitudes of the pulses 136 in FIG. 8a always remain at a constant level. However, the trailing edge of each squarewave pulse 136 during a clock period is varied to vary the width thereof in accordance with the amplitude of error half sinewave 112 during that interval. Thus, in the illustration, for ease in understanding, only eight squarewave pulses are provided to represent the dashed positive half sinewave 134, the widest pulse being located at the center interval wherein the amplitude of the half sinewave is the largest and the narrowest pulses being provided at each end where the half sinewave approaches zero volts. It should be especially noted in FIGS. 8a and 4 that each positive squarewave pulse 136 has its trailing edge switched to zero for the short interval during a clock pulse period the transistor Q3 is turned off.

In a similar manner, as illustrated in FIG. 8b, the negative dashed half sinewave 135 represents the fundamental frequency component of the burst 133' of pulses 136' which is obtained by inverting the d.c. supply voltage from the battery 35 by the use of the bursts of drive pulses 126 and 127 whose widths have been modulated to have sinusoidally varying duty cycles.

It should be noted that the negative going squarewave pulses 136' in FIG. 8b are a mirror image of the positive going squarewave pulses 136 in FIG. 8a. Moreover, it should be appreciated that in the present power supply system each of the positive and negative dashed half sinewaves in FIG. 8a and 8b is synchronized with the corresponding half of the reference sinewaves having a frequency of, say, 60 Hz and is divided by the 25 K Hz oscillator into 210 intervals. Thus, each dashed half sinewave 134 and 135 is actually composed of a burst of 210 pulses whose widths have been modulated to have sinusoidally varying duty cycles.

Referring again to FIG. 7, the burst 133 of pulses on the plus d.c. input bus 68 is applied on the collector of transistor Q1 and the burst 133' of pulses on the minus d.c. input bus 69 is applied on the emitter of transistor Q2. Now, inasmuch as no utility sinewave 12 is present across input terminals 10 and 11 during blackout, no other voltages are present on the collector of transistor Q1 and the emitter of transistor Q2. Thus, when transistors Q1 and Q2 are alternately turned on by squarewave pulses 20 and 21, alternating positive and negative bursts 133 and 133' of pulses, as provided on the plus d.c. input bus 68 and the minus d.c. input bus 69, are provided at the common junction 16 leading to the low pass filter 26. The filter 26 filters out the high frequencies forming these squarewave pulses and passes the fundamental frequency components 134 and 135 to provide the regulated sinewave 29 on the output terminal 24.

Reference will next be made to FIG. 9 which illustrates the operation of the uninterruptible power supply when a brownout occurs. In this case the input utility sinewave 12 is assumed to be at approximately half amplitude and consequently when separated by diodes CR1 and CR2 it provides a reduced amplitude positive half sinewave 66 on plus d.c. input line 13 and a reduced amplitude negative half sinewave 67 on the minus d.c. input line 14.

Referring back to FIG. 4, the summing of the feedback half sinewave signal 109 and the reference half sinewave signal 98 in error amplifier 111 provides an error half sinewave signal 112 which is less than that provided for blackout in FIG. 7 when the inverter 50 was made to run at 100% duty cycle. Thus in this case, where the input sinewave 12 is at a half amplitude, the amplitude of error half sinewave signal 112 for brownout is 0.65 VAC such that the inverter 50 is running at approximately 50% duty cycle. It should be appreciated, of course, that the inverter 50 may be running any where between 100% duty cycle and 0% duty cycle to supply any percentage of the power as needed to maintain the 105 VAC power at the output.

In any case, it is desired that the output sinewave be regulated at 105 VAC. So if the error half sinewave signal 112 is larger in amplitude that that shown in FIG. 4, for example, the pulses produced by the modulator 46 are wider and the drive transistors Q3 and Q4 are on longer each clock pulse period, and if the error sinewave signal 112 is smaller in amplitude then that shown in FIG. 4, the pulses produced by the modulator 46 are narrower and the drive transistors Q3 and Q4 are on for shorter times each clock pulse period. So basically, the error half sinewave signal 112 produces a burst of width modulated pulses corresponding to a half sinewave that is some fixed ratio of the regulated output sinewave 29. In other words, the error amplifier 111 detects the loss of voltage on the output sinewaves and causes the inverter 50 to run to provide bursts of pulses that just make up for this loss.

The bursts 119 of pulses, whose widths have been modulated in modulator 46 by the error half sinewave signal 112, provide the bursts 126 and 127 (FIG. 4) of drive pulse on lines 62 and 63, respectively, connected to the base electrodes of transistors Q3 and Q4 to cause the inverter 50 during brownout to generate the bursts 139 and 139′ of pulses on the plus and minus d.c. input busses 68 and 69, respectively, as shown in FIG. 9.

Next to be described is the manner in which the bursts 139 and 139′ of positive and negative going sinusoidally varying pulses on plus and minus d.c. input busses 68 and 69, respectively, are diode ORed each half cycle with the low amplitude positive and negative half input sinewaves 66 and 67 provided on the plus and minus d.c. input lines 13 and 14, respectively, to provide a positive composite waveform 140, as illustrated in FIG. 10a, on the collector of transistor Q1 and a composite negative composite waveform 140′ as illustrated in FIG. 10b, on the emitter of transistor Q2.

First to be noted is that the diode CR1 in plus d.c. input line 13 and the similarly oriented diodes CR3 and CR5 in the full wave diode rectifier 52 that are joined to the plus d.c. input bus 68 are all connected at a point 22 (FIG. 9) to the collector of transistor Q1. Thus, because of diode ORing of the three input OR circuit thus formed, the positive going composite waveform 140 appearing at the collector of transistor Q1 is determined at any given time by the more positive of the voltages present on the respective anodes of the diodes CR1, CR3 and CR5.

Likewise, the diode CR2 in minus d.c. input line 14 and the similarly oriented diodes CR4 and CR6 in the full wave diode rectifier 52 that are joined to the minus d.c. input bus 69 are all connected at point 23 (FIG. 9) to the emitter of transistor Q2. Thus, because of diode ORing of the three input OR circuit thus formed, the negative going composite waveform 140′ appearing at the emitter of the transistor Q2 is determined at any given time by the more negative of the voltage present on the respective cathodes of the diodes CR2, CR4 and CR6.

The manner in which this diode ORing is accomplished is best explained by referring to FIG. 10a which diagrammatically illustrates the composite waveform 140 when a burst of eight varying width pulses is used to represent the dashed half sinewave 147 instead of the burst of 210 varying width pulses as actually provided by the use of the 25 K Hz oscillator 116.

Thus, in FIG. 10a when a squarewave pulse 142, for example, of the burst 139 of pulses appearing on the plus d.c. input bus 68, switches to 0 volts, for the short interval that transistor Q3 is turned off during a clock pulse period of the 25 K Hz oscillator 116, the positive half sinewave 66 is the more positive of the voltages appearing on the collector of transistor Q1 during this short interval. Consequently, this portion 143 of the positive half sinewave 66 will pass through diode CR1 and appear at the collector of transistor Q1. It is for this reason that the positive half sinewave 66 is seen between the squarewave pulses 142 (FIG. 10a). In other words, because of the diode ORing of the three inputs provided by diodes CR1, CR3 and CR5 at any given time, the more positive of the voltages that appears on the plus d.c. input bus 68 is seen on the collector of transistor Q1.

In a similar manner, in the composite waveform 140′ illustrated in FIG. 10b, the negative half sinewave 67 is seen between the squarewave pulses 142′ forming the burst of pulses 139′ as provided on minus d.c. input bus 69 by inverter 50. In other words, the composite waveforms 140 and 140′ each include an envelope, namely, the positive and negative half sinewave 66 and 67, respectively, that the squarewave pulses 142 and 142′ in the bursts 139 and 139′, respectively, always return to rather than a zero voltage, as they do when an input power sinewave 12 is not present on terminal 10, as illustrated in FIG. 8a, for example.

Note that each of the pulses 142 and 142′ forming the respective composite waveform 140 and 140′ are only as wide as they have to be during brownout to just supplement the incoming reduced amplitude half sinewave 65 or 65′ so as to provide an output sinewave 29 having the desired regulated voltage of 105 VAC. In particular, the width of each pulse 142 and 142′ will be proportioned to the difference of the amplitudes of the actual utility input sinewave present and the desired regulated output sinewave.

Thus, in FIG. 9, transistor Q1 is turned on by squarewave pulse 20 during the positive half cycle of the reference sinewave 92 to pass the composite positive waveform 140 onto common junction 16 and transistor Q2 is turned on by the squarewave pulse 21 during the negative half cycle of the reference sinewave 92 to pass the composite negative waveform 140′ onto common junction 16. Upon this alternating composite waveform passing through low pass filter 26, the output full regulated sinewave 29 appears on the output terminal 24.

While the invention has been illustrated and described in detail in the drawings and foregoing description, the same is to be considered as illustrative and not restrictive in character, it being understood that only the preferred embodiment has been shown and described and all changes and modifications that come within the spirit of the invention are also desired to be protected.

What is claimed is:

1. An uninterruptible power supply system for supplementing a utility power supply with an auxiliary power supply when the utility power fails, said system comprising:
   an input terminal having input sinewaves of said utility power supplied thereto;

an output terminal for supplying output sinewaves to a load;

a plus d.c. line and minus d.c. line connected to said input terminal;

rectifying means in said plus d.c. line and said minus d.c. line responsive to input sinewaves on said input terminal to provide positive half sinewaves on said plus d.c. line and negative half sinewaves on said minus d.c. line;

a plus d.c. bus and a minus d.c. bus;

said auxiliary power supply including means responsive to output sinewaves on said output terminal for detecting the loss in amplitude of the output sinewaves when the utility power supply partially fails to drive said auxiliary power supply and including rectifying means to provide positive going bursts of varying width pulses whose duty cycles vary sinusoidally on said plus d.c. bus and negative going bursts of varying width pulses whose duty cycles vary sinusoidally on said minus d.c. bus;

a first synchronous switch and a second oppositely phased synchronous switch, each said switches having an input and an output with the outputs joined to a common junction;

said plus d.c. line and said plus d.c. bus connected to provide positive going composite waveforms on the input of said first synchronous switch for passing positive going composite waveforms to said common junction during the positive halves of the input sinewaves;

said minus d.c. line and said minus d.c. bus connected to provide negative going composite waveforms on the input of said second oppositely phased synchronous switch for passing negative going composite waveforms to said common junction during the negative halves of the input sinewaves; and a low pass filter for filtering out the high frequencies of said positive and negative going composite waveforms on said common junction to provide output sinewaves on said output terminal.

2. An uninterruptible power supply system as defined in claim 1 wherein said auxiliary power supply includes:

a battery;

an inverter means connected to said battery for generating positive and negative going pulses; and said rectifying means comprises a full wave rectifier circuit coupled to the output of said inverter means, said full wave rectifier circuit including diodes oriented to pass positive going pulses to provide said positive going bursts of pulses on said plus d.c. bus and including diodes oriented to pass negative going pulses to provide said negative going bursts of pulses on said minus d.c. bus.

3. An uninterruptible power supply system as defined in claim 2 wherein said inverter means includes:

a transformer having a primary winding and a secondary winding; and wherein said diodes oriented to pass positive and negative going pulses are connected to each end of said secondary winding.

4. An uninterruptible power supply system as defined in claim 1 wherein said first and second oppositely phased synchronous switches are first and second n-p-n transistors with said plus d.c. line and said plus d.c. bus connected to the collector of said first n-p-n transistor and said minus d.c. line and said minus d.c. bus connected to the emitter of said second n-p-n transistor, and the emitter of said first n-p-n transistor and the collector of said second n-p-n transistor connected to said common junction, and including means for applying a reference squarewave in phase with said input sinewave on the base electrode of said first n-p-n transistor and an inverted reference squarewave on the base electrode of second n-p-n transistor.

5. An uninterruptible power supply having utility input sinewaves on the input terminal thereof and output sinewaves on the output terminal thereof, said power supply comprising:

a plus and a minus d.c. line;

a pair of rectifying diodes oriented for separating said input sinewaves to provide positive and negative half sinewaves on said plus and minus d.c. lines, respectively;

a plus and a minus d.c. bus;

an inverter transformer having a secondary winding;

a full wave rectifier connected across said secondary winding, said full wave rectifier including rectifying diodes oriented to provide positive and negative pulses on said plus and minus d.c. busses;

means for generating reference sinewaves defining positive and negative half cycles;

control means for comparing output half sinewaves with the reference half sinewaves to provide error half sinewave signals indicative of the loss in the power when the utility power supply partially fails;

a battery;

means responsive to said error half sinewave signals for providing bursts of drive pulses for driving said inverter transformer from said battery to provide positive and negative going bursts of pulses on said plus and minus d.c. busses;

a pair of oppositely phased synchronous switches; and a common junction;

said positive half sinewaves being diode ORed with said positive going pulses to form positive going composite waveforms which are passed through one of said synchronous switches to said common junction during the positive half cycles of said reference sinewaves, and said negative half sinewaves being diode ORed with said negative going pulses to form negative going composite waveforms which are passed through the other of said synchronous switches to said common junction during the negative half cycles of said reference sinewaves; and a low pass filter for filtering out high frequencies of said composite waveforms to provide said output sinewaves on said output terminal.

6. An uninterruptible power supply system as defined in claim 5 wherein said bursts of drive pulses for driving said inverter transformer comprise varying width pulses having sinusoidally varying duty cycles and wherein said positive and negative going bursts of pulses on said plus and minus d.c. busses comprise varying width pulses having sinusoidally varying duty cycles.

7. An uninterruptible power supply system for supplementing a utility power supply with an auxiliary power supply when the utility power supply fails, said system comprising:

an output terminal for supplying output sinewaves to a load;

an input terminal for receiving utility input sinewaves;

plus and minus d.c. lines connected to said input terminal;

a diode in said plus d.c. line oriented to pass positive half sinewaves;

a diode in said minus d.c. line oriented to pass negative half sinewaves;

said auxiliary power supply including;

a battery;

an inverter means including a transformer having a secondary winding;

a full wave rectifier including a pair of oppositely oriented diodes connected to each end of said secondary winding;

a plus d.c. bus connected to the diodes on the opposite ends of second secondary winding oriented to pass positive pulses;

a minus d.c. bus connected to the diodes on the opposite ends of said secondary winding oriented to pass negative pulses;

means for generating reference half sinewaves;

control means connected to said output terminal for comparing output half sinewaves with the reference half sinewave signals to provide error half sinewave signals and for generating bursts of drive pulses having sinusoidally varying duty cycles in accordance with said error half sinewave signals for driving the inverter means from said battery to provide positive and negative going pulses having sinusoidally varying duty cycles on the plus and minus d.c. busses;

first and second oppositely phased synchronous switches, each having an input and an output, said outputs being connected to a common junction;

said plus d.c. line and said plus d.c. bus connected to the input of said first synchronous switch;

said minus d.c. line and said minus d.c. bus connected to the input of said second oppositely phased synchronous switch; and a low pass filter connected between said common junction and said output terminal;

whereby when said auxiliary power supply is at full power said inverter means is turned off and the positive and negative half sinewaves of said input sinewaves passed by the diodes in said plus and minus d.c. lines are reconstructed by the first and second synchronous switches and passed through said low pass filter to provide the output sinewaves on the output terminal;

whereby when said utility power supply completely fails said inverter means is turned on in response to the output of said control means to provide bursts of positive and negative going pulses on the plus and minus d.c. busses which are reconstructed by the first and second synchronous switches an passed through said low pass filter to provide the output sinewaves on the output terminal; and whereby when said utility power partially fails the inverter means is turned on in response to the output of said control means to provide bursts of positive and negative going pulses on the plus and minus d.c. busses which are diode ORed with reduced amplitude positive and negative halves of the sinewaves on the plus and minus d.c. lines, respectively, to form positive and negative going composite waveforms which are reconstructed by the first and second synchronous switches and passed through said low pass filter to provide the output sinewaves on the output terminal.

8. An uninterruptible power supply system for supplementing an AC utility power supply to a load with power as supplied by a battery when the AC utility power fails, said system comprising:

an output terminal for supplying output sinewaves to a load;

an input terminal for receiving utility input sinewaves;

a plus d.c. line connected to said input terminal and having a diode therein to pass positive half sinewaves;

a minus d.c. line connected to said input terminal and having a diode therein to pass negative half sinewaves;

an inverter means;

means for generating reference half sinewaves;

control means connected to said output terminal for comparing output half sinewaves with said reference half sinewaves to provide error half sinewave signals and providing drive pulses having sinusoidally varying duty cycles in accordance with said error half sinewave signals for driving said inverter means with said battery to provide positive and negative going pulses having sinusoidally varying duty cycles;

a plus d.c. bus and a minus d.c. bus;

a full wave rectifier having a pair of diodes oriented to pass said positive going pulses on said plus d.c. bus and having a pair of diodes oriented to pass said negative going pulses on said minus d.c. bus;

first and second oppositely phased synchronous switches having inputs and outputs, said outputs being connected to a common junction;

said plus d.c. line and said plus d.c. bus connected to the input of said first synchronous switch;

said minus d.c. line and said minus d.c. bus connected to the input of said second synchronous switch; and a low pass filter connecting said common junction to said output terminal.

9. A method of supplementing sinewaves as supplied by a utility power supply to a load with the power from an auxiliary power supply which includes an inverter when the utility power supply starts to fail, comprising the steps of:

separating sinewaves as supplied by the utility power supply to provide rectified positive half sinewaves and rectified negative half sinewaves;

generating reference half sinewaves which are in phase with the sinewaves supplied by the utility power supply;

continually comparing half sinewaves derived from the sinewaves supplied to the load with the reference half sinewaves to define error half sinewaves;

modulating said error half sinewaves to provide bursts of pulses having sinusoidally varying duty cycles for driving said inverter to provide bursts of rectified positive going pulses having sinusoidally varying duty cycles and bursts of rectified negative going pulses having sinusoidally varying duty cycles;

providing a first synchronous switch and a second oppositely phased switch, said switches having a common output;

combining the rectified positive half sinewaves with the bursts of rectified positive going pulses having sinusoidally varying duty cycles to form positive going composite waveforms which are fed through said first synchronous switch to said common output during positive halves of the reference sinewaves;

combining the rectified negative half sinewaves with the bursts of rectified negative going pulses having sinusoidally varying duty cycles to form negative going composite waveforms which are fed through said second oppositely phase synchronous switch to said common output during the negative halves of the reference sinewaves; and filtering out the high frequency components of the positive going and negative going composite waveforms to supply sinewaves to the load.

* * * * *